(No Model.)
T. W. MORAN.
CYLINDER COUPLING JOINT.
No. 443,946.  Patented Dec. 30, 1890.
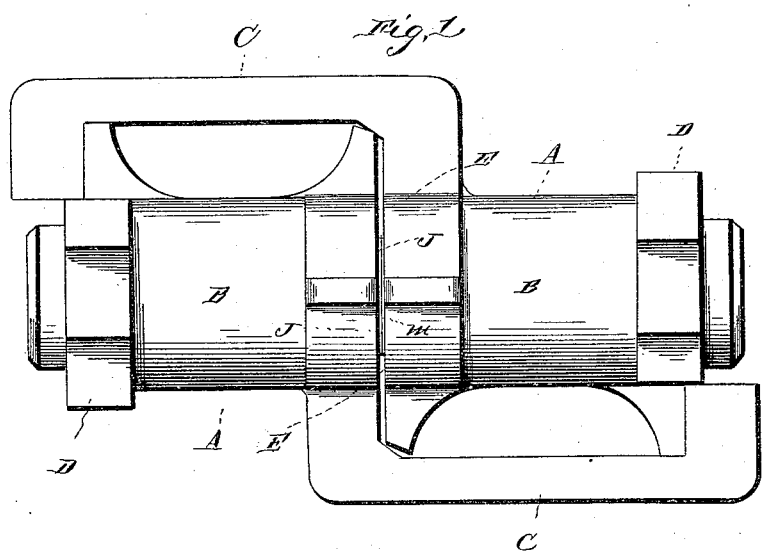
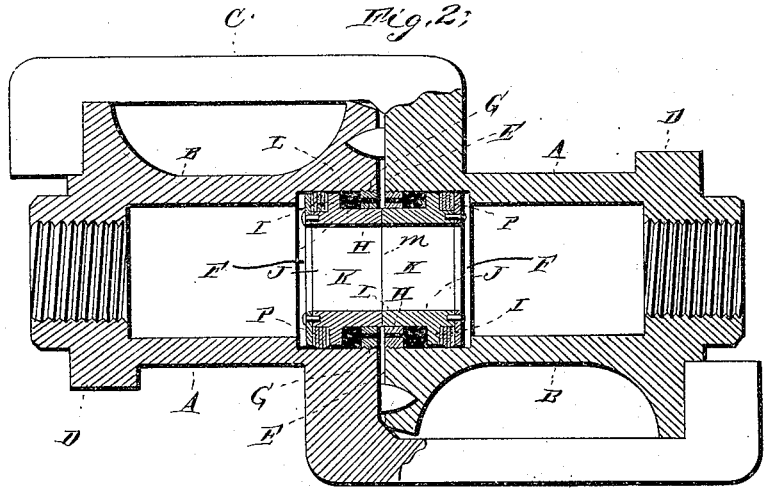
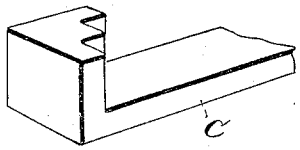
WITNESSES:
INVENTOR
Thomas W. Moran
BY
E. W. Anderson
his ATTORNEY.

UNITED STATES PATENT OFFICE.

THOMAS W. MORAN, OF LOUISVILLE, KENTUCKY, ASSIGNOR TO THE MORAN FLEXIBLE STEAM JOINT COMPANY, OF SAME PLACE.

CYLINDER COUPLING-JOINT.

SPECIFICATION forming part of Letters Patent No. 443,946, dated December 30, 1890.

Application filed February 24, 1890. Serial No. 341,525. (No model.)

*To all whom it may concern:*

Be it known that I, THOMAS W. MORAN, a citizen of the United States, and a resident of Louisville, in the county of Jefferson and State of Kentucky, have invented certain new and useful Improvements in Cylinder Coupling-Joints; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view of my invention. Fig. 2 is a vertical longitudinal section, and Fig. 3 is a detail view.

This invention has relation to cylinder-couplings for pipes designed to carry steam, air, or water under pressure; and it consists in the novel construction and combination of parts, as hereinafter set forth.

In the accompanying drawings, the letters A A designate the sections of the coupling, which consist of the cylinder portions B B and their clamping devices C C.

The outer end of each cylinder B is provided with a wrench-seat at D, and is threaded to enable it to be connected to a joint of pipe. Its inner end E is usually plane, and is adapted to be abutted against the inner end of the opposite section, to which it is to be coupled.

Each cylinder is chambered in cylindrical form, as indicated at F, and the opening of this chamber is threaded, usually at G, to provide for securing the annular guard H within the mouth of the cylinder. Within the cylinder-chamber and back of this guard is located the piston-form joint-piece J, which is formed with a central opening K, extending through its cylindrical or tubular projection L, which is provided with a plane circular ground bearing-face *m*. The tubular projection L projects through the opening of the annular guard, and its face is designed to engage the ground bearing-face of the tubular portion of the joint-piece of the opposite coupling-section A when these sections are connected together.

The piston-form joint-piece J is provided with the flange I of proper diameter to fit easily within the cylinder-chamber, and this flange is provided with a recess bearing around its edge to receive the packing P, so that it will have a steam-tight bearing against the cylinder-wall. When the coupling-sections are connected and steam is turned into the pipes, the pressure of the steam, acting against the flanges of the piston-form joint-pieces, forces their tubular portions against each other, and the plane circular faces of these portions become automatically coapted, so that the joint between them is steam-tight. It therefore makes no difference whether the coupling-sections A A have lateral movement or are not in true relation. The automatic righting of the joint-pieces J J under the pressure of the steam is sufficient to secure a steam-tight joint.

The annular guards H of the cylinders are preferably provided with perforations to afford purchase to a wrench, so that they can be readily removed and replaced when necessary.

Having described this invention, what I claim, and desire to secure by Letters Patent, is—

The cylinder coupling-joint consisting of the hollow cylinder-sections having integral therewith at opposite ends clamping devices reversely engaging the distant ends of said sections, said sections also having each at its outer end a cylindric chamber of greater diameter than the bore of the section, and fitted with an annular guard at its outer edge, forming with the inner wall or end of the cylindric chamber a supplemental chamber or space, and the cylindric hollow piston-joint pieces of a diameter to fit said supplemental chambers or spaces, and provided with tubular extensions or projections of a diameter to adapt them to fit and slide within said annular guards, said piston-joint pieces being adapted to be acted upon and have their meeting outer ends to be engaged steam-tight by the pressure of the steam itself, substantially as and for the purpose set forth.

In testimony whereof I affix my signature in presence of two witnesses.

THOS. W. MORAN.

Witnesses:
PHILIP C. MASI,
C. L. TAYLOR.